United States Patent
Ozkan (10) Patent No.: US 10,638,194 B2
(45) Date of Patent: Apr. 28, 2020

(54) EMBEDDING INTERACTIVE OBJECTS INTO A VIDEO SESSION

(71) Applicant: AT&T Intellectual Property I, L.P., Atlanta, GA (US)

(72) Inventor: Mehmet Ozkan, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 51 days.

(21) Appl. No.: 14/270,629

(22) Filed: May 6, 2014

(65) Prior Publication Data

US 2015/0326925 A1 Nov. 12, 2015

(51) Int. Cl.
*H04N 21/466* (2011.01)
*H04N 21/4725* (2011.01)
(Continued)

(52) U.S. Cl.
CPC ........... *H04N 21/466* (2013.01); *G06Q 30/02* (2013.01); *G06Q 30/0243* (2013.01); *H04N 21/23412* (2013.01); *H04N 21/4316* (2013.01); *H04N 21/44008* (2013.01); *H04N 21/458* (2013.01); *H04N 21/4722* (2013.01); *H04N 21/4725* (2013.01); *H04N 21/47205* (2013.01); *H04N 21/858* (2013.01); *H04N 21/8547* (2013.01); *H04N 21/4314* (2013.01); *H04N 21/812* (2013.01)

(58) Field of Classification Search
CPC ........... H04N 21/458; H04N 21/44008; H04N 21/4725; H04N 21/812
See application file for complete search history.

(56) References Cited

U.S. PATENT DOCUMENTS

| 5,594,507 A | 1/1997 | Hoarty |
| 5,604,544 A | 2/1997 | Bertram |

(Continued)

FOREIGN PATENT DOCUMENTS

| WO | 9843437 A1 | 10/1998 |
| WO | 9847084 A1 | 10/1998 |

(Continued)

OTHER PUBLICATIONS

"VideoClix Turning Viewers into Customers", Retrieved from <<http://www.videoclix.tv/pages/about/index.php>>, Retrieved on May 5, 2014, 2 pages.

(Continued)

*Primary Examiner* — Brian T Pendleton
*Assistant Examiner* — Frank Johnson
(74) *Attorney, Agent, or Firm* — Guntin & Gust, PLC; Atanu Das (57) ABSTRACT

A method includes receiving, at a media device, overlay data associated with media content. The overlay data includes information indicating a time and a position at which a particular object is represented within the media content, and the overlay data includes information associating the particular object with supplemental information. The method further includes, during playback of the media content, receiving user input at the media device, and, responsive to the user input, generating an overlay display based on the overlay data, where the overlay display causes the particular object to be highlighted in a display of the media content.

20 Claims, 5 Drawing Sheets

(51) Int. Cl.
*G06Q 30/02* (2012.01)
*H04N 21/44* (2011.01)
*H04N 21/458* (2011.01)
*H04N 21/431* (2011.01)
*H04N 21/4722* (2011.01)
*H04N 21/234* (2011.01)
*H04N 21/472* (2011.01)
*H04N 21/8547* (2011.01)
*H04N 21/858* (2011.01)
*H04N 21/81* (2011.01)

(56) References Cited

U.S. PATENT DOCUMENTS

| | | | |
|---|---|---|---|
| 5,969,715 | A | 10/1999 | Dougherty et al. |
| 5,982,445 | A | 11/1999 | Eyer et al. |
| 6,151,626 | A | 11/2000 | Tims et al. |
| 6,184,863 | B1 | 2/2001 | Sibert et al. |
| 6,240,555 | B1 | 5/2001 | Shoff et al. |
| 6,426,778 | B1 | 7/2002 | Valdez, Jr. |
| 6,470,094 | B1* | 10/2002 | Lienhart ............ G06K 9/325 382/171 |
| 7,158,676 | B1 | 1/2007 | Rainsford |
| 7,409,437 | B2 | 8/2008 | Ullman et al. |
| 7,421,723 | B2 | 9/2008 | Harkness et al. |
| 7,577,978 | B1 | 8/2009 | Wistendahl et al. |
| 7,899,705 | B2* | 3/2011 | Fuisz ................ 705/14.55 |
| 8,161,412 | B2 | 4/2012 | Weeks et al. |
| 8,228,325 | B2 | 7/2012 | Barbaro Altieri |
| 8,255,952 | B2 | 8/2012 | Boylan, III et al. |
| 8,356,329 | B2 | 1/2013 | Katcher et al. |
| 8,522,273 | B2 | 8/2013 | Huber et al. |
| 2002/0126990 | A1* | 9/2002 | Rasmussen ........ H04N 7/17318 386/240 |
| 2003/0035075 | A1 | 2/2003 | Butler et al. |
| 2003/0131357 | A1 | 7/2003 | Kim |
| 2004/0268416 | A1 | 12/2004 | Gray et al. |
| 2006/0136305 | A1 | 6/2006 | Fitzsimmons et al. |
| 2006/0259930 | A1* | 11/2006 | Rothschild .............. 725/81 |
| 2007/0083908 | A1 | 4/2007 | McCarthy et al. |
| 2007/0250901 | A1* | 10/2007 | McIntire ............ H04N 7/17318 725/146 |
| 2007/0285439 | A1* | 12/2007 | King .................. G09G 5/397 345/638 |
| 2008/0068500 | A1* | 3/2008 | Krause ............... H04N 5/44508 348/473 |
| 2008/0209480 | A1* | 8/2008 | Eide ................... G11B 27/105 725/87 |
| 2008/0253739 | A1 | 10/2008 | Livesey |
| 2010/0312596 | A1 | 12/2010 | Saffari et al. |
| 2011/0082735 | A1 | 4/2011 | Kannan et al. |
| 2011/0093875 | A1 | 4/2011 | Simmons et al. |
| 2011/0106612 | A1 | 5/2011 | Roberts et al. |
| 2011/0126252 | A1 | 5/2011 | Roberts et al. |
| 2011/0289401 | A1* | 11/2011 | Fischer .............. G06F 17/211 715/232 |
| 2012/0140025 | A1 | 6/2012 | Friedman |
| 2012/0167145 | A1* | 6/2012 | Incorvia ............ H04N 21/4725 725/60 |
| 2012/0185905 | A1* | 7/2012 | Kelley ............... H04N 9/75 725/109 |
| 2012/0198496 | A1* | 8/2012 | Yuan ................. H04N 21/4725 725/40 |
| 2012/0271711 | A1 | 10/2012 | Moshiri et al. |
| 2012/0304065 | A1* | 11/2012 | Cai ........................ 715/719 |
| 2012/0314133 | A1* | 12/2012 | Kim ................... G09G 5/08 348/564 |
| 2012/0331503 | A1 | 12/2012 | Gray et al. |
| 2013/0031584 | A1 | 1/2013 | Chane et al. |
| 2013/0085851 | A1 | 4/2013 | Pedro et al. |
| 2013/0091249 | A1* | 4/2013 | McHugh .......... H04N 21/23439 709/219 |
| 2013/0113993 | A1 | 5/2013 | Dagit, III |
| 2013/0212477 | A1* | 8/2013 | Averbuch .......... H04N 21/4725 715/719 |
| 2013/0251338 | A1* | 9/2013 | Abecassis ............ H04N 5/445 386/241 |
| 2014/0150017 | A1 | 5/2014 | Chang |
| 2014/0160305 | A1* | 6/2014 | Kiriyama .......... H04N 5/44513 348/207.1 |
| 2014/0215529 | A1* | 7/2014 | Good ................ H04N 21/4725 725/60 |
| 2014/0359656 | A1* | 12/2014 | Banica ................ H04N 21/812 725/32 |
| 2015/0026718 | A1* | 1/2015 | Seyller .............. H04N 21/4316 725/34 |
| 2015/0134600 | A1* | 5/2015 | Eisner ................ H04L 51/04 707/608 |

FOREIGN PATENT DOCUMENTS

| | | |
|---|---|---|
| WO | 0045599 A2 | 8/2000 |
| WO | 2006090159 A1 | 8/2006 |
| WO | 2007051273 A2 | 5/2007 |
| WO | 2010141939 A1 | 12/2010 |

OTHER PUBLICATIONS

Bellman, S. et al., "The Impact of Adding Interactivity to Television Advertising on Elaboration, Recall and Persuasion", Retrieved from <<http://researchrepository.murdoch.edu.au/8594/1/impact_of_adding_interactivity.pdf>>, 2004, pp. 1-8.

Perakakis, E. et al., "HTML5 and Companion Web Technologies as a Universal Platform for Interactive Internet TV Advertising", 2002 International Conference on Telecommunications and Multimedia (TEMU), Jul./Aug. 2012, IEEE, Piscataway, NJ, pp. 214-219.

Vennou, P. et al., Abstract of "Evaluating program-embedded advertisement format in interactive digital TV", Retrieved from <<http://dl.acm.org/citation.cfm?id=2000149>>, EuroITV '11, Proceedings of the 9th International Conference on Interactive Television, 2011, ACM, New York, NY, 1 page.

* cited by examiner

EMBEDDING INTERACTIVE OBJECTS INTO A VIDEO SESSION

FIELD OF THE DISCLOSURE

The present disclosure is generally related to embedding interactive objects into a video session.

BACKGROUND

Digital advertising spending continues to grow. Examples of digital advertising include interactive advertising via a television platform. Traditional broadcasting technologies tend to use static television advertising programs (e.g., "commercials") which do not benefit from all of the advantages offered by digital advertising technologies. For example, television programs often include static one-way advertising content that does not allow viewer interaction. Relative to interactive viewing, one way viewing experiences may have less impact on the viewers and lead to fewer sales or other transaction events.

DETAILED DESCRIPTION

Embodiments disclosed herein offer a method to highlight selected objects within a program (e.g., a television program) to allow viewers to participate interactively with the program. In particular, objects represented within an existing program (e.g., a program that has not been specifically edited to provide interactive content) may be associated with supplemental content. The supplemental content may include overlay data that specifies locations of objects within the existing program and provides information about highlighting the objects on a display. Creating and embedding dynamic selectable objects into a program provides an enhanced viewing experience for consumers. In particular examples, the overlay data may be received by a media device after playback of the program has begun at the media device. Further, the overlay data may be received by a plurality of media devices, each receiving the program in a different display format. For example, each of the plurality of media devices may receive the program in a different resolution, and the overlay data may include overlay information for the program in each resolution. Receiving common overlay data during playback may enable greater flexibility in distribution of the overlay data. For example, a single instance of the overlay data may be stored at a server and may be distributed in response to requests.

Embedded objects may be associated with actions or additional information (e.g., alternative or additional streams of information associated with the object or the program). For example, an embedded object may be used to provide an e-commerce capability (e.g., by indicating that a viewer may order a product that he or she has seen during the program). As another example, an embedded object may enable interactive television commercials. To illustrate, during a television commercial that is otherwise static, a viewer may select an image or representation of a product. In an illustrative example, a system (e.g. a computing device) can redirect the viewer to an online order page or can facilitate the completion of an order associated with the product. Alternatively, or in addition, the viewer can select to be provided with additional information. The system may access the additional information (e.g., a web page or other e-commerce link associated with the product) and display the additional information on a television viewed by the viewer.

Figure 1:
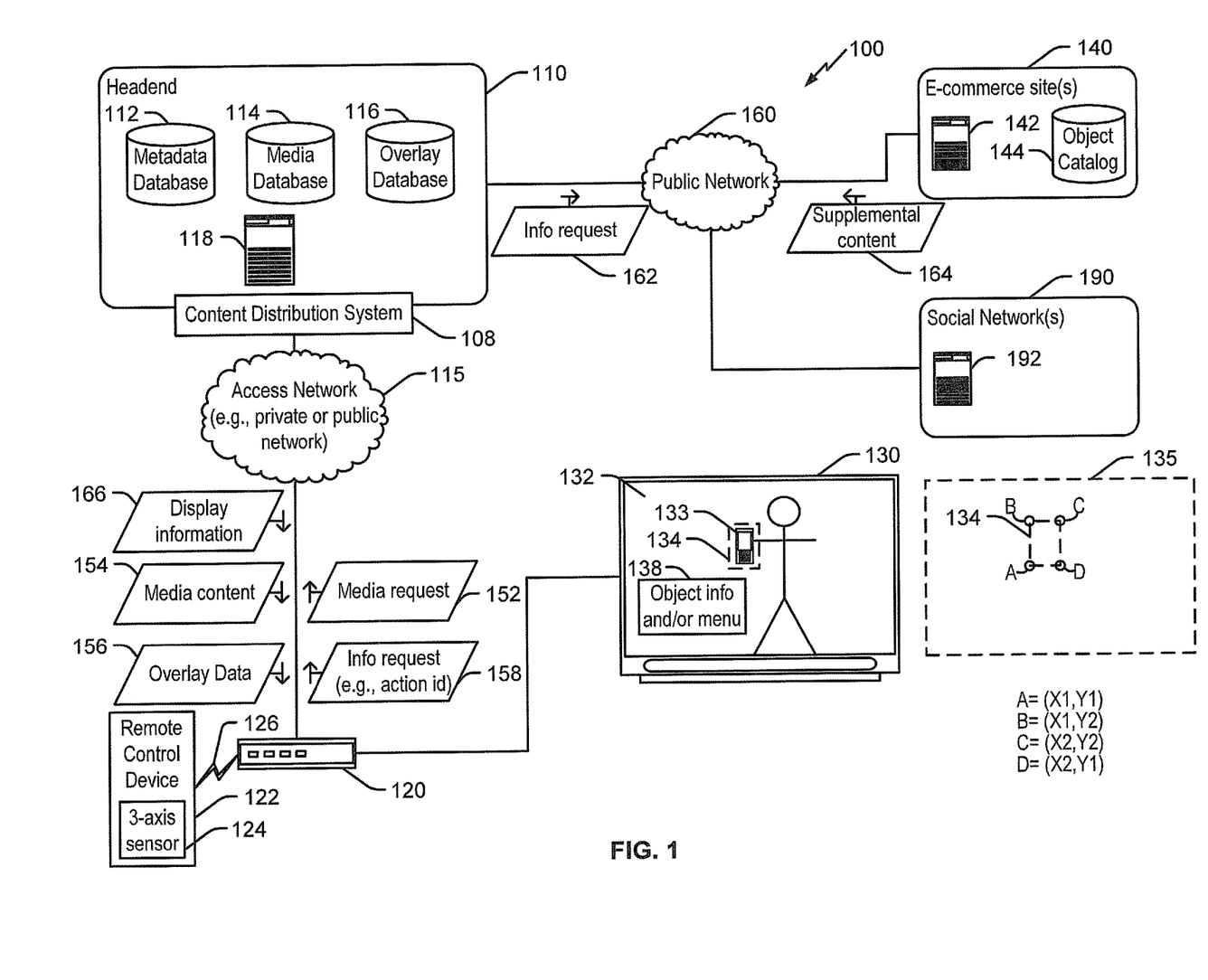
FIG. 1 illustrates a particular example of a system to display an overlay associated with media content.

FIG. 1 illustrates a particular embodiment of a system 100 configured to display an overlay associated with media content. The system 100 includes a headend 110, such as a cable television headend, an internet protocol television (IPTV) headend, a satellite television headend, or other media distribution headend. The headend 110 may be associated with one or more media devices, represented by media device 120. In alternative examples, the functions described as performed by the headend 110 may be performed by a server on a public network, such as a server that is connected to the Internet and that distributes video content. Although only one media device 120 is illustrated in FIG. 1, the headend 110 may be coupled to more than one media device. In a particular example, the media device 120 includes a set-top box device. In other examples, the media device 120 may include any device that executes media player software, such as a personal computer, a mobile phone, a tablet computing device, etc.

In one example, one or more media devices may be associated with subscribers in a geographic region, such as a city, or a portion of a city.

The media device 120 may be coupled to one or more display devices 130, such as televisions. Each display device 130 may be adapted to display a representation 132 of media content based on user interaction requesting particular media content. In a particular embodiment, the media content has not been adapted specifically for purposes of providing dynamic interactive capabilities. The headend 110 may communicate with the media device 120 via a content distribution system 108 and one or more access networks 115. The access network 115 may include a satellite distribution network, a cable television network, an Internet protocol network, or another wired or wireless communication network that enables the media device 120 to access media content via the headend 110.

During use, a user associated with the media device 120 may use a remote control device 122 to provide a control signal 126 to the media device 120. The control signal 126 may be transmitted via a wired connection or wirelessly (e.g., via an infrared or radio frequency signal). The control signal 126 may indicate selection of particular media content 154, such as via an electronic program guide (EPG) or a channel change request. In response to the control signal 126, the media device 120 may transmit a media request 152 to the headend 110. In response to the media request 152, the headend 110 may acquire data associated with the particular media content 154 requested by the media request 152. For example, the media content 154 may include a television program, a live broadcast, video on demand content, pay per view content, or other media content accessible via the headend 110. In a particular example illustrated in FIG. 1, the headend 110 includes a media database 114 from which the media content 154 may be accessed by a server 118. However, in other embodiments, the headend 110 may access the media content 154 from a media content provider (not shown).

In response to the media request 152 identifying the media content 154, the headend 110 may transmit the media content 154 to the media device 120. Additionally, the headend 110 may provide overlay data 156 to the media device 120. The overlay data 156 may be accessed by the headend 110 at an overlay data base 116 included at the headend 110 or received from a remote provider such as an interactive content provider (not shown). For example, in response to the media request 152, the headend 110 may access a metadata database 112. The metadata database 112 may contain information about the particular media content 154, such as information identifying whether an overlay file associated with the particular media content 154 is accessible in the overlay database 116 (or via the remote provider). When the overlay file is indicated to be present in the overlay database 116, the server 118 may access the overlay database 116 and provide the overlay file as the overlay data 156 to the media device 120. In a particular embodiment, the overlay data 156 may be provided to the media device 120 after the media device 120 transmits the media request 152, after the headend 110 transmits the media content 154, or a first portion of the media content 154, to the media device 120, or during playback of the media content 154 at the media device 120. For example, the overlay data 156 may be provided to the media device 120 in response to a request from the media device 120 for the overlay data 156. The overlay data 156 may be provided to the media device 120 as part of a media stream corresponding to the media content 154 or via a separate data stream or side channel.

In particular examples, the overlay data 156 is generated automatically (e.g., the overlay data 156 may be generated using an image recognition system to automatically identify objects in the media content 154). Alternatively, the overlay data 156 may be generated by a user (e.g., a user associated with the headend 110 or a user associated with an overlay provider (not shown)). For example, the user may correspond to a content provider, an advertiser, or a developer hired to generate overlays. The user may use software to view the media content 154 and to generate (e.g., draw) bounding boxes (e.g., a box that, when overlaid on media content, contains a particular object) and create descriptive information. The software may store information describing the bounding boxes and descriptive information in the overlay data 156. For example, the information describing the bounding boxes may include coordinate points relative to one or more screen resolutions. The overlay data 156 can be a relatively small file including information such as a time stamp (e.g., an indication of a time, relative to a beginning of a media stream, that an object first appears in the media stream or a portion thereof), coordinate locations of a bounding box 134, an object descriptor associated with an object 133, and information (e.g., an action identifier) indicating a particular action to be taken or selectable menus to be displayed in response to selection of the object 133 or display of the bounding box 134. Accordingly, a flat file can be used to provide the overlay data 156 such that the overlay data 156 consumes little bandwidth relative to the media content 154.

Figure 2:
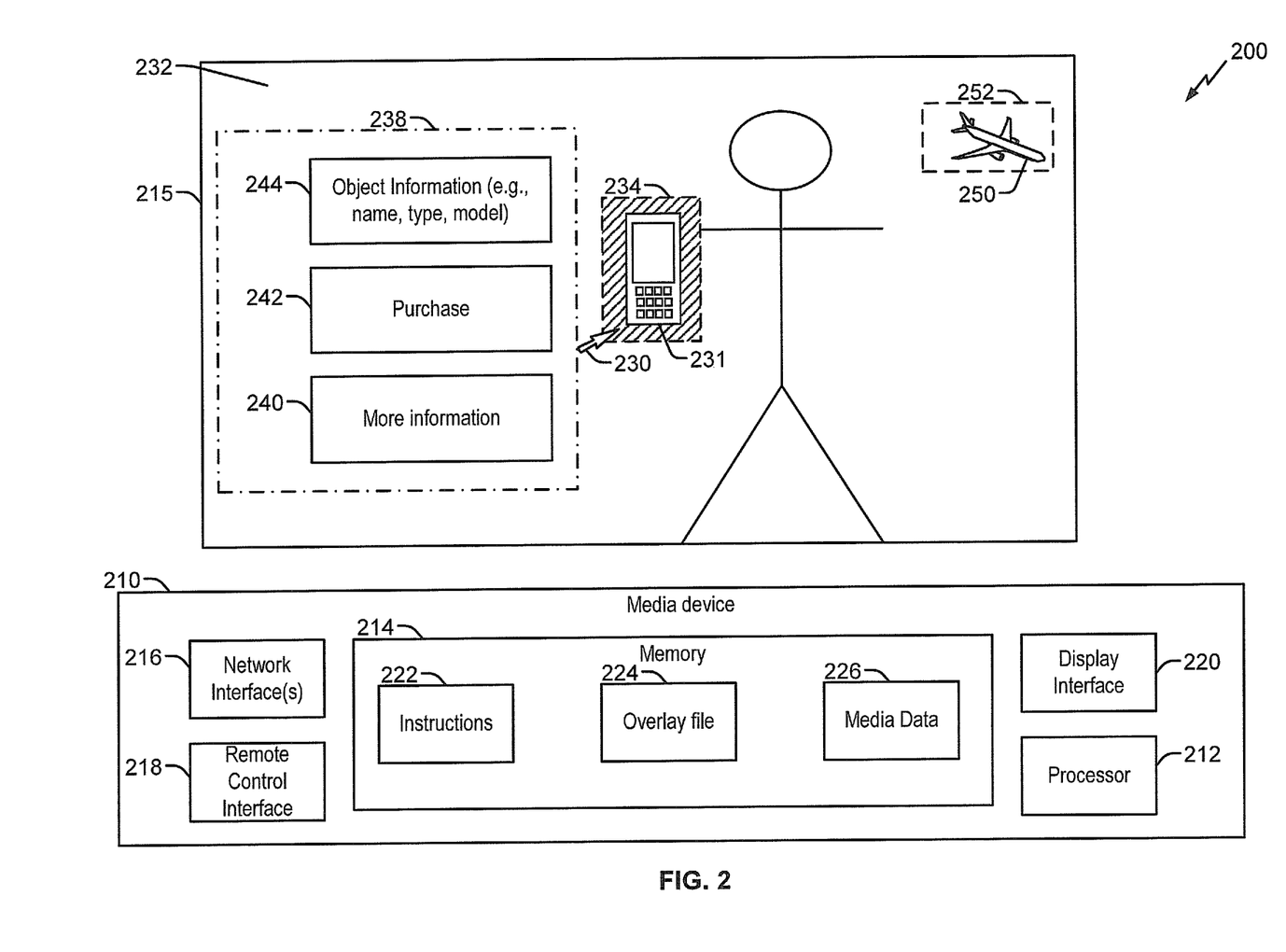
FIG. 2 illustrates another particular example of a system to display an overlay associated with media content.
Figure 3:
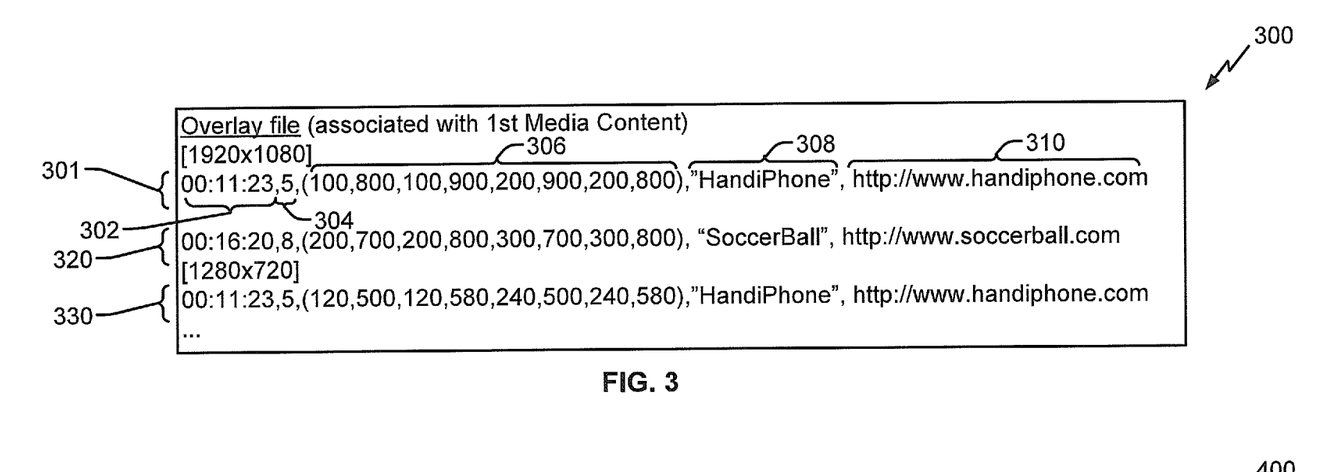
FIG. 3 illustrates a particular example of overlay data within an overlay file.

The media device 120 may begin playback of the media content 154 by generating the representation 132 at the display device 130. During the playback of the media content 154, the media device 120 may also examine the overlay data 156 to determine when an object is represented in the representation 132 that is associated with the overlay data 156. For example, the overlay data 156 may include a plurality of entries associated with the representation 132. In a particular example, the overlay data 156 may include an entry for each object that is highlightable within the representation 132. The media content 154 may include more than one highlightable object. An example of media content including multiple highlightable objects is shown in FIG. 2, and an example of an overlay file describing multiple highlightable objects is shown in FIG. 3. In some examples, the overlay data 156 may include multiple entries for a particular object at different times. For example, the object 133 may appear and may be highlightable in the media content 154 at a plurality of different times, and the overlay data 156 may include an entry for each time period the object 133 is highlightable in the media content 154. Each entry may include a time stamp, or a time stamp range, and position data associated with the object. For example, in the embodiment illustrated in FIG. 1, the overlay data 156 may include a time stamp, or a time stamp range, and position data describing when and where the bounding box 134 that is associated with the object 133 is located in the representation 132 of the media content 154.

Additionally, the overlay data 156 may include an indication that the bounding box 134 and the associated object 133 are associated with interactive content at the time indicated by the time stamp and the position indicated by the position data. Further, the overlay data 156 may include one or more action identifiers associated with one or more objects (or bounding boxes defining the objects). Each action identifier may correspond to an action related to an object (e.g., retrieve additional information about the object using a particular uniform resource locator, place a phone call (e.g., via a voice over internet protocol (VoIP) server) to a particular vendor of the object, place an order for the particular object, etc.).

In particular examples, the media content 154 may correspond to a particular program in a first display format (e.g., a first resolution and/or a first frame rate). The overlay data 156 may include overlay information corresponding to a plurality of versions of the particular program. Each version of the program may have a different display format. For example, one version of the program may have a first display resolution and/or frame rate and another version of the program may have a second display resolution and/or frame rate. The overlay data 156 may include entries for each highlightable object in each version of the program. Thus, the same overlay data 156 may be sent to a media device that receives the particular program in the first display format and to a media device that receives the particular program in a second format.

FIG. 1 also includes an example of overlay information 135. The overlay information 135 is represented separate from the representation 132 to illustrate components of the overlay information 135. The overlay information 135 may be determined based on the overlay data 156. The overlay information 135 may represent non-visible components of overlay data used to determine or identify a location of the selectable object 133 in the representation 132. In particular, the overlay information 135 may define the bounding box 134 associated with the object 133. The bounding box 134 may define a region of the representation 132 that is to be highlighted in response to user input to enable selection of supplemental content associated with the object 133, as described further with reference to FIG. 2.

In the example shown in FIG. 1, the bounding box 134 is defined by four vertices, each corresponding to a pixel of the representation 132. For example, the vertices may include vertex A, vertex B, vertex C, and vertex D. The vertices may correspond to xy coordinate pixel positions defining a rectangular bounding box. The xy coordinate pixel positions may be relative to a two-dimensional coordinate system having maximum values described by maximum horizontal and vertical pixel resolution counts in a particular format. In other embodiments, other mechanisms to define the bounding box may be used. For example, the bounding box 134 may be defined based on a starting vertex such as vertex A, and a predefined size or indication of a selection of a predefined size (e.g., assuming that each side of the rectangle is parallel to one of the x-axis and the y-axis of a display and perpendicular to the other axis, the starting vertex may identify a particular vertex, such as the top left vertex, and the size may define dimensions of the rectangle). In another example, the bounding box 134 may be defined by a pair of non-adjacent vertices (e.g., A and C or B and D). For example, given that A=(X1,Y1) and C=(X2,Y2), the two remaining vertices may be determined (e.g., by the media device 120) to be located at (X1, Y2) and (X2, Y1) based on the properties of rectangles. In other embodiments, the bounding box may be a non-rectangular polygon and may be defined by more (e.g., the bounding box may be a pentagonal, hexagonal, heptagonal, octagonal, etc.) or less than four vertices (i.e., the bounding box may be triangular). In some embodiments, the bounding "box" may not be a polygon (e.g., the bounding "box" may include one or more curved sides).

During playback of the media content 154 by the media device 120, the overlay information 135 may be hidden. In response to user input indicating an interest in a particular object, the overlay information 135 may be used to generate the bounding box 134 on the representation 132 (i.e., highlight the object 133 by drawing the bounding box 134). Additionally, object information or menus 138 may be provided to enable selection of particular information or content. For example, the object information or menus 138 may be displayed in response to a selection of the object 133 once the object 133 is highlighted.

In a particular example, the remote control device 122 may include a three axis sensor 124. The three axis sensor 124 may detect movement of the remote control device 122 by the user. In response to movement of the remote control device 122 by the user during playback of the media content 154 at the display device 130, the media device 120 may determine that the user is interacting with the media content 154. Accordingly, the media device 120 may present the bounding box 134 indicating that the object 133 is selectable. Alternatively, the media device 120 may control a pointing device, as shown in FIG. 2, in response to movement of the remote control device 122. When the pointing device hovers at a particular location, such as within the bounding box 134, for a threshold period of time the media device 120 may display the bounding box 134 to highlight the object 133 to indicate that the object is selectable.

Thus, the media device 120 may receive user input during playback of the media content 154 (e.g., movement of the remote control device 122 during playback of the media content 154 indicating the user device is interacting with media content or hovering within a bounding box) and, responsive to the user input, the media device 120 may generate an overlay display based on the overlay data 156. The overlay display may cause the object 133 to be highlighted in the representation 132 of the media content 154 to enable selection of supplemental content. Highlighting the object in response to user input may allow a user to determine which objects are selectable without pausing playback of media content.

Upon receiving a selection of the highlighted object 133 (e.g., detecting a "click" within the bounding box 134 or detecting that the pointer remains within the bounding box 134 for a threshold period of time), the media device 120 may display the object information and/or menus 138. In a particular example, the media device 120 pauses playback of the media content 154 when displaying the object information and/or menus 138. When the media device 120 receives a selection of the object 133 within the bounding box 134 or a selection of a particular option from the object information or menus 138, the media device 120 may send an information request 158 to the headend 110. For example, the information request 158 may include information identifying the bounding box 134 or the particular option from the object information or menus 138 selected by the user.

The information request 158 may include an action identifier associated with one or both of the object 133 and a particular option from the object information or menus 138. The action identifier may have been received with the overlay data 156, as described above, and may correspond to action information stored at the overlay database 116. The headend 110 may identify and perform the corresponding action. For example, the corresponding action may include requesting additional information, enabling voice communications between the media device 120 and another device, initiating a commercial transaction, or any other action. The headend 110 may perform the action internally or may send a request 162 to a remote source, such as an e-commerce site 140. In other examples, the remote source may include non-commercial sources, such as informational web pages or call centers. The request 162 may be sent via a public network 160 or via a private communication network. The e-commerce site 140 includes one or more servers 142 and an object catalogue 144. The request 162 may include an identifier of the object 133 which may correspond to an identifier in the object catalogue 144. The request may further indicate an action, such as purchase, initiate voice communications, obtain additional information, or any other action. In response to the request 162, the e-commerce site 140 may provide supplemental content 164 (e.g., an order confirmation, an informational web page, a voice or video connection, any other supplemental content, or a combination thereof) associated with the object 133 to the headend 110 or directly to the media device 120 via the network 160.

In response to receiving the supplemental content 164, the headend 110 may provide additional information, such as display information 166, to the media device 120. The display information 166 may instruct the media device 120 how to display the supplemental content, such as in a pop-up window (e.g., in a window that overlays the representation 132), via a separate channel, and so forth. In examples where the supplemental content 164 includes a voice or video connection, the display information 166 may instruct the media device 120 to display connection identification information (e.g., caller ID information).

In a particular embodiment, the media device 120 may include an object overlay setting. The object overlay setting may indicate whether the user associated with the media device 120 elects to enable interactive information associated with media associated with media presented by the media device 120. For example, the overlay setting may be disabled and in response the media device 120 may not send the information request 158 or may not receive the overlay data 156. Thus, interactive content may be disabled at the media device 120 and the display device 130. Alternately, the overlay setting may be enabled such that the media device 120 operates to provide supplemental content responsive to user input.

In a particular embodiment the media device 120 may include a process that executes an overlay application. The overlay application may generate an overlay display based on the overlay data 156. The overlay display may include the bounding box 134. Additionally, the overlay application may match a time stamp, or a time stamp range, associated with the media content to a time stamp, or a time stamp range, associated with the overlay data 156 in order to determine which objects are associated with supplemental content or bounding boxes at a particular time during playback of the media content 154. For example, during playback of the media content 154, the media device 120 may check the overlay data 156 periodically (e.g., every second) for one or more entries having time periods corresponding to the current playback time of the media content 154.

In another embodiment, the overlay application is executed in response to user input such as pointer or control input indicating that the user is requesting information associated with a particular object in the representation 132. For example, in embodiments where the remote control device 122 is used to direct a pointer in the representation 132 to a particular position, the overlay application may be executed when the pointer hovers at a particular location for a threshold period of time. The overlay application may check one or more time stamps associated with the overlay data 156 to determine objects within the representation 132 that are selectable. The overlay application may display an overlay display, including the bounding box 134 in the example of FIG. 1, indicating selectable objects. In addition, the overlay application may generate (e.g., in response to a selection of the object 133) other selectable options associated with the object 133 such as the object information and/or menus 138.

During presentation of the bounding box 134, the object information and/or menus 138, or both, the overlay application may cause playback of the media content 154 to be paused. If the media content 154 is received as a stream (e.g., as a stream of data packets from the headend 110), the media device 120 may record the media content 154 to a memory of the media device 120 (for subsequent playback after interaction associated with the object 133 is complete). Thus, the system 100 may provide a mechanism for associating the supplemental content 164 with the object 133 represented in media content 154. Further, the media content 154 does not need to be modified to enable interaction associated with the particular object 133. Therefore, data need not be added to the media content 154 and transmitted to user devices that do not support or have not requested interactive content.

In a particular embodiment, the object information and/or menus 138 may include options associated with social network interactions. Alternatively, certain social network interaction icons may be automatically displayed without receiving prior user input. In one example, the object information and/or menus 138 may include an icon associated with a "like" interaction. A selection of the "like" icon may cause execution of an application on an application server (e.g., the server 118). For example, the media device 120 may send the information request 158 including an action identifier of the "like" icon. The server 118 may receive (e.g., as part of the information request 158) social network subscription information from the media device 120 and may send a request to a server 192 of a social network 190. The server 192 may update a profile of a user associated with the media device 120 based on the request (e.g., indicate that the user "likes" the media content 154).

As another example, the object information and/or menus 138 may include a "share" icon. A selection of the "share" icon may cause the application server to upload particular content to the social network 190. For example, when a user "shares" a movie (e.g., the media content 154) that he or she is watching, a trailer for the movie may be uploaded to the social network 190 and shared with "friends" or "followers" of the user. Alternately, or in addition, the media device 120 may send the application server elapsed time information that indicates how far into a movie or television program the user selected the "share" icon. The application server may use the elapsed time information to generate a "clip" of the movie or television program to upload to the social network 190. For example, the "clip" may be automatically generated by cropping a particular amount of time before and/or after the elapsed time (e.g., from 10 seconds before the elapsed time to 10 seconds after the elapsed time). Thus, the present system and method may enable subscribers to share "interesting" moments of a movie or program and encourage other viewers (e.g., social network "friends" or "followers") to view that movie or program (or the identified clip).

Additional interactions may also be performed or enabled. For example, an automatic social networking update may be sent to the social network 190 based on the media content 154 (e.g., "I am watching [movie title] on channel [number]"). The social network 190 may also include a link to a trailer, advertisement, and/or on-demand listing for the media content 154. As another example, the object information and/or menus 138 may include a "more information" icon that, when selected, cause the server 118 to retrieve information regarding the media content 154 from a third-party source (e.g., an online encyclopedia).

FIG. 2 illustrates a system 200 to display an overlay over media content. The system 200 includes a media device 210 and a display 215. In a particular embodiment, the media device 210 may correspond to or include the media device 120 of FIG. 1. The display 215 may correspond to or include the display device 130.

In the illustrated embodiment, the display 215 displays a representation 232 of media content and overlay information corresponding to the media content. The overlay information is represented by a first bounding box 234, a second bounding box 252, and a plurality of object information options 238. The object information options 238 may include an object information option 244, a purchase option 242, a more information option 240, other options not shown, or any combination thereof. The representation 232 includes a first object 231 associated with the first bounding box 234 and a second object 250 associated with the second bounding box 252.

In the example illustrated in FIG. 2, the first bounding box 234 is highlighted indicating that the first object 231 is selectable based on the presence of a pointer 230 within a region corresponding to the bounding box 234. The plurality of object information options 238 may be displayed in response to a selection of the first object 231. The second object 250 may also be selectable but may not be highlighted while the pointer 230 is located outside of the second bounding box 252.

In FIG. 2, the media device 210 includes a processor 212 and a memory 214 accessible to the processor 212. The memory 214 includes instructions 222 that are executable by the processor 212 to perform actions associated with the media device 210, such as sending information requests, receiving media content, generating a representation of media content, generating an overlay display, receiving overlay data, receiving display information, and so forth. The media device 210 may also be associated with one or more interfaces such as a display interface 220 that is configured to be coupled to a display device, such as the display 215 or the display device 130 of FIG. 1, in order to display media content and/or additional information, such as supplemental content and overlay displays. The media device 210 also includes one or more network interfaces 216 to provide access to communications from the headend 110 of FIG. 1 or other network devices or systems, such as the e-commerce site 140 of FIG. 1. The network interfaces 216 may include wired or wireless interfaces to enable communication via a cable television network, a satellite data link, via a cellular data link, via DSL, or via a fiber link.

The media device 210 may also include a remote control interface 218 (e.g., a wireless sensor). The remote control interface 218 may enable interaction with a remote control device, such as the remote control device 122 of FIG. 1. For example, the remote control device 122 may provide control signals 126 to the media device 120 via a remote control interface such as the remote control interface 218.

In a particular embodiment, the memory 214 includes an overlay file 224. The overlay file 224 may include overlay data associated with a particular media content item. For example, the overlay file 224 may correspond to a particular program or a particular video on demand media content item accessed by the media device 210. In a particular embodiment, the overlay file 224 stores overlay data such as the overlay data 156 of FIG. 1. The memory 214 may also include media data 226. The media data 226 may correspond to media content such as the media content 154 received from the network headend 110. The media data 226 may also correspond to media content received from other sources such as personal media content associated with a user or recorded media content that is previously recorded and is not streamed from a headend. The overlay file 224 may correspond to the media data 226. For example, one or more programs stored in the memory 214 as the media data 226 may have a corresponding overlay file 224 that provides information to generate an overlay display associated with the particular media content item.

The memory 214 may include multiple programs, and each program is associated with interactive content. The overlay files 224 may include multiple files, each file corresponding to a particular program or media content item. For example, when the media device 210 is a digital video recorder that stores media content in the memory for later playback, the memory 214 may also store corresponding overlay files associated with the media content stored at the digital video recorder to enable a display of overlay data when the stored media content is played back.

During operation, the media device 210 may receive an overlay file (e.g., the overlay file 224) as overlay data associated with particular media content (e.g., media content included in the media data 226). The overlay data may include information indicating a time and position at which a particular object such as the first object 231 is represented in the media content. The overlay data may also include information associating the first object 231 with supplemental information, such as information accessed by selection of the more information option 240. In particular examples, the overlay data includes information associated with objects for a plurality of time periods. For example, the overlay data may include information describing a plurality of time periods during which the first object 231 appears in the media content. In particular examples, the overlay file 224 may include information indicating overlay data for a plurality of versions of the media content (e.g., a plurality of display resolutions and/or frame rates of the media content). For example, the first object 231 may appear at different times and/or locations in a first version of the media content as compared to a second version of the media content.

During playback of the media content, the media device 210 may receive user input (e.g., via the remote control interface 218). The user input may correspond to movement of a movement sensitive remote control device (e.g., the remote control device 122) indicated via a signal received at the remote control interface 218. For example, the user input may include a point of control input that controls the pointer 230. The media device 210 may determine a position within the representation 232 of the pointer 230 based on the pointer control input. Responsive to the user input, the media device 210 may generate the overlay display based on the overlay data. For example, the media device 210 may cause the first object 231 to be highlighted via the bounding box 234 in response to user input indicating selection of the first object 231 (e.g., the pointer 230 being located within the first bounding box 234 for a particular period of time). In a particular embodiment, the media device 210 does not cause overlay information for an object to be displayed unless the object is selected. For example, while the first object 231 is selected, the first bounding box 234 may be highlighted, but the second bounding box 252 associated with the second object 250 may not be displayed.

When the first bounding box 234 is highlighted, the media device 210 may receive a further selection of the object 231 (e.g., detect a "click" within the bounding box 234 or determine that the pointer 230 stays within the bounding box 234 for a threshold period of time) and display additional information 238 in response to the further selection. In the illustrated embodiment, the additional information 238 includes object information 244. The object information 244 may include a description of the first object 231. The additional information 238 further includes a more information option 240 to display additional information about the first object 231 and a selectable option 242 to conduct a transaction related to the object 231.

Thus, the system 200 may display an overlay over media content. The overlay may be invisible until a selectable object is selected and may therefore be unobtrusive. Further, the overlay may be generated without altering associated media content.

Figure 4:
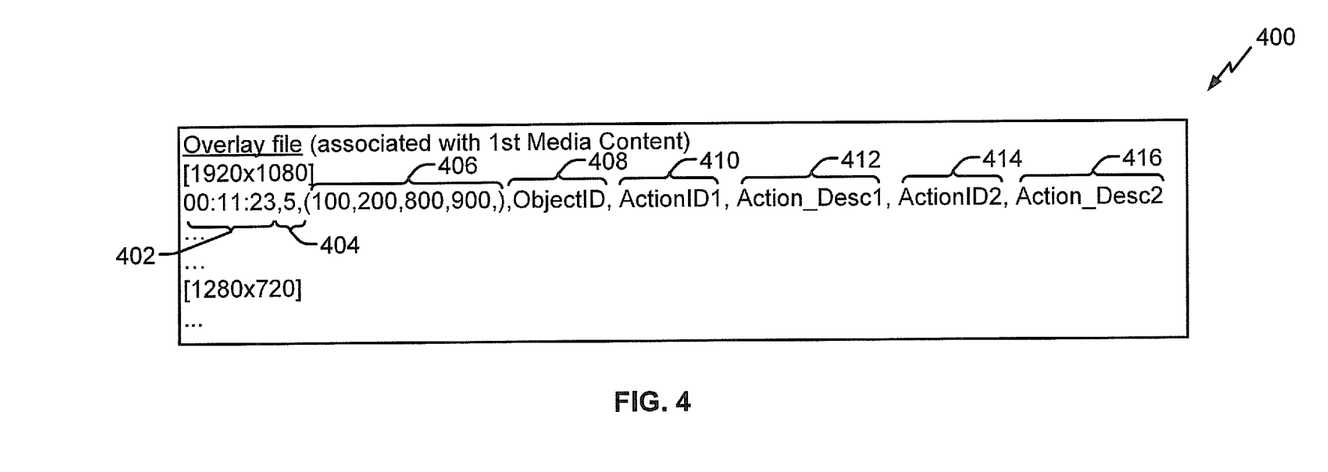
FIG. 4 illustrates another particular example of overlay data within an overlay file.

FIGS. 3 and 4 illustrate particular embodiments of overlay data within an overlay file. For example, the overlay files represented in FIGS. 3 and 4 may correspond to the overlay file 224 of FIG. 2 or the overlay data 156 of FIG. 1 or both.

Overlay file 300 of FIG. 3 includes information associated with a first media content item. An overlay file may include a plurality of entries each associated with a time stamp indicating when a particular object is represented within the media content item. For example, the overlay file 300 includes a first entry 301 with a time stamp 302. Each entry of the overlay file may also be associated with a duration indicating how long (e.g., in seconds) the object is represented in the display. For example, the first entry 301 includes a duration 304. Entries of the overlay file may also include information indicating coordinates of a bounding box, which describe where a media device (e.g., the media device 120 or the media device 210) should draw the bounding box associated with the particular object. In the illustrated example, the first entry 301 includes coordinates 306.

As illustrated, in the overlay file 300, the coordinates 306 may include coordinate pairs associated with vertices of a bounding box (e.g., the bounding box 134, the first bounding box 234, or the second bounding box 252). In other examples, the coordinates may be represented in other ways, such as with a coordinate of a particular vertex and a default size selection or by other mechanisms. Each entry of the overlay file 300 may also include an object identifier indicating a name or other identifier associated with the object associated with the bounding box. For example, the first entry 301 includes an object identifier 308 that identifies a "HandiPhone" object. In some examples, an entry of an overlay file such as the first entry 301 may further include an object descriptor (not shown) that describes an object. Further, the entries of an overlay file may include supplemental information associated with an object such as a communication address associated with an advertiser or other supplemental information. For example, the first entry 301 includes supplemental information 310 identifying a website associated with the object identified by the object identifier 308.

In a particular embodiment, the media content item may be formatted for display at different types of display devices. For example, different display devices may have a different pixel count or a different aspect ratio. Accordingly, the overlay file may include entries associated with each object for multiple display formats, including pixel count, aspect ratio and so forth. Thus, the overlay file 300 includes a first set of entries associated with a display format of 1920 pixels by 1080 pixels. Additionally, the overlay file 300 includes a second set of entries associated with a display format including 1280 pixels by 720 pixels. The overlay file 300 may include more than or fewer than the two display formats indicated. For example, the display overlay file 300 may include entries associated with each envisioned display format including high definition standard definition, three-dimensional, ultra-high definition, 4 k, as well as multiple aspect ratios. Each version of the media content may have different associated playback times (e.g., due to differences in frame rates) and a particular object may be located at different coordinates in each version. Accordingly, the overlay file 300 may include a plurality of entries for a particular object, where each entry of the plurality identifies a time and a location that the particular object appears in the version corresponding to the entry. In the illustrated example, the overlay file 300 includes a third entry 330 corresponding to the first entry 301 at a different resolution (1280×720) than the first entry 301 (1920×1080).

FIG. 4 illustrates another particular embodiment of an overlay file 400. The overlay file 400 may correspond to the overlay file 224 of FIG. 2 or the overlay data 156 of FIG. 1 or both.

The overlay file 400 includes a time stamp 402 and a duration 404. The time stamp 402 and the duration 404 may function as described in reference to the time stamp 302 and the duration 304. The overlay file 400 further includes coordinate information 406 associated with a particular object or objects in a display. In the illustrated example, the coordinate information may define two vertices, such as two non-adjacent vertices. A media device (e.g., the media device 120 or the media device 210) may calculate the remaining vertices based on the coordinate information 406 and properties of rectangles (e.g., a rectangle has four right angles). The overlay file 400 also includes an object ID 408. The object ID 408 may identify a particular object (e.g., the object 133, the first object 231, or the second object 250) represented in media content.

The overlay file 400 further includes a first action ID 410 and a first action description 412. The first action ID 410 may identify a first action to be performed that is related to the particular object identified by the object ID 408. The overlay file further includes a second action ID 414. The second action ID 414 may identify a second action to be performed that is related to the particular object identified by the object ID 408. The overlay file 400 further includes a first action description 412 and a second action description 416 that describe the first action and the second action, respectively.

Upon receiving user input during playback of media content, a media device (e.g., the media device 120 or the media device 210) may output an overlay. The overlay may include highlighting of one or more objects based on entries in the overlay file 400. Upon receiving a selection of a particular object at a particular time during playback of the media content, the media device may display a menu that includes options corresponding to actions described in an entry that corresponds to the particular object and the particular time. For example, upon receiving user input (e.g., movement of a remote control device during playback or hovering within a bounding box defined by the coordinate information 406) the media device may cause the bounding box defined by the coordinate information 406 to be displayed. Upon detecting a selection of the object associated with the bounding box (e.g., detecting a click within the bounding box) the media device may display a menu with a menu option for each of the action descriptions 412 and 416.

In response to receiving a selection of a menu option corresponding to the first action description 412, the media device may send the object ID 408 and the first action ID 410 to an external server to perform the first action, as explained above. Similarly, in response to receiving a selection of a menu option corresponding to the second action description 416, the media device may send the object ID 408 and the second action ID 414 to the external server to perform the second action, as explained above.

Thus, the overlay files 300 and 400 may enable an overlay to be generated for a media content item without altering the media content item. The overlay files 300 and 400 may further enable actions to be performed that are related to the media content item. In addition, the overlay files 300 and 400 may be sent to a plurality of media devices that may receive the media content item in different formats. Further, the overlay files 300 and 400 may be sent to a media device after the media device has begun playback of the related media content item.

Figure 5:
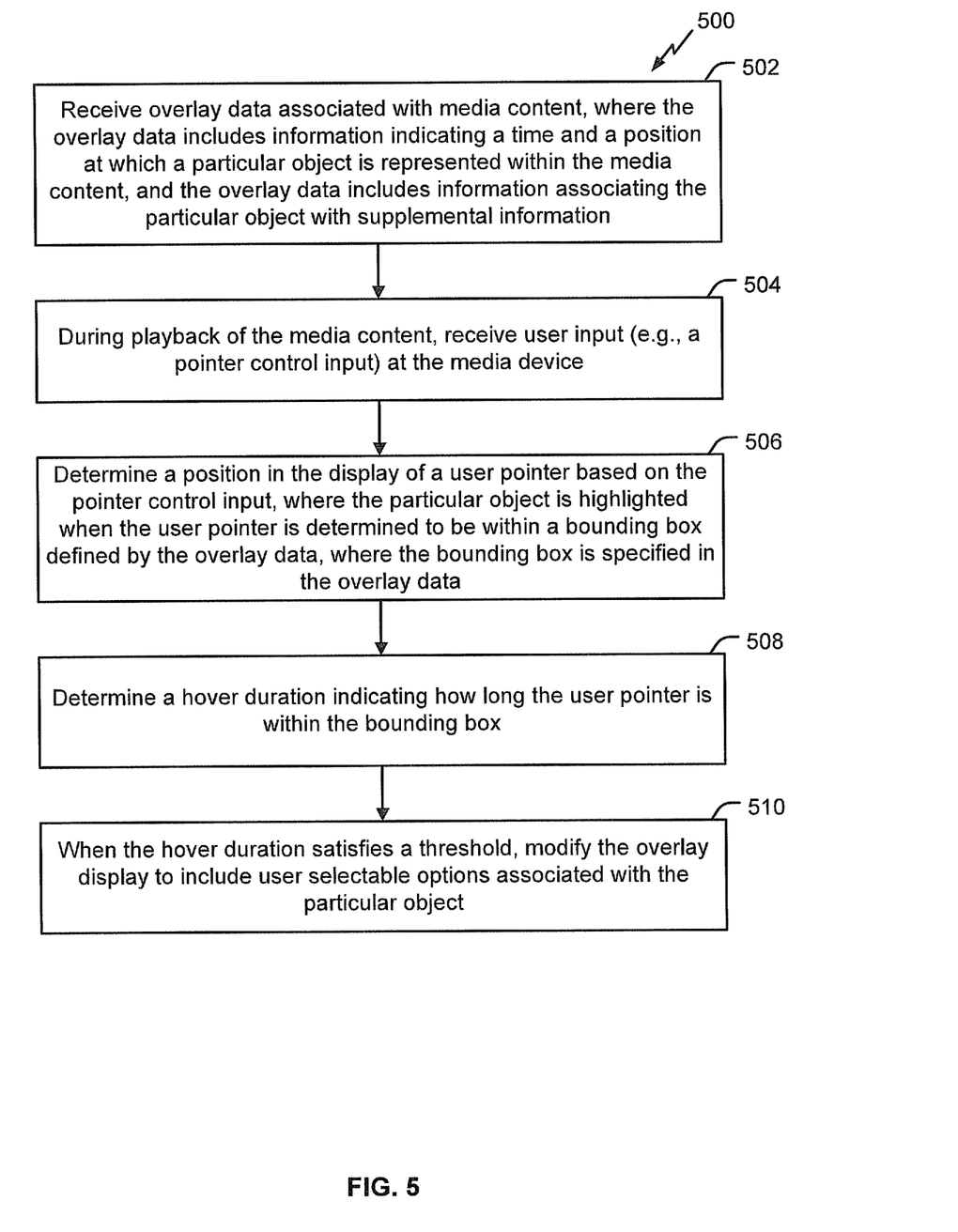
FIG. 5 illustrates a method of displaying an overlay associated with media content.

FIG. 5 shows a flowchart illustrating a method 500 of generating an overlay for media content. The method 500 includes receiving overlay data associated with media content, where the overlay data includes information indicating a time and a position at which a particular object is represented within the media content and the overlay data includes information associating the particular object with the supplemental information, at 502. The overlay data may be received in an overlay file during playback of the media content. For example, the media device 120 may receive the overlay data 156 from the headend 110 during playback of the media content 154. The overlay data 156 may be associated with the media content 154. The overlay data 156 may indicate a time and a position in the representation 232 of the media content 154 that the object 133 is shown. Similarly, the media device 210 may receive and store the overlay file 224 in the memory 214. The overlay file 224 may be associated with the media data 226. The overlay file 224 may indicate a time and position that the first object 231 and the second object 250 appear in the representation 232 of the media data 226. The content of overlay files is further explained above with reference to FIGS. 3 and 4.

The method 500 further includes, during playback of the media content, receiving user input (e.g., a pointer control input) at the media device, at 504. For example, the media device 120 may receive the control signal 126 from the remote control device 122 while outputting the representation 132 of the media content 154. Further, the media device 210 may receive input via the remote control interface 218 while outputting the representation 232 of the media data 226.

The method further includes determining a position in the display of a user pointer based on the pointer control input, where the particular object is highlighted when the user pointer is determined to be within a bounding box defined by the overlay data, where the bounding box is specified in the overlay data. For example, the media device 120 may position of a pointer in the representation 132 and highlight the bounding box 134 when the pointer is within the bounding box 134. Further, the media device 210 may determine a location of the pointer 230 based on input received at the remote control interface 218. The media device 210 may highlight the first bounding box 234 based on determining that the position of the pointer 230 is within the first bounding box 234.

The method 500 further includes determining a hover duration indicating how long the pointer is within the bounding box, at 508. For example, the media device may determine that the pointer is within the bounding box 134 for a threshold period of time. Further, the media device 210 may determine that a location of the pointer 230 is within the first bounding box 234 for a threshold period of time.

The method 500 further includes, when the hover duration satisfies a threshold modifying the overlay display to include user selectable options associated with the particular object, at 510. For example, the media device 120 may display the object information or menu 138 in response to detecting that the position of the pointer is within the bounding box 134 for the threshold period of time. Further, the media device 210 may display the object information options 238 in response to detecting that the position of the pointer 230 is within the first bounding box 234 for the threshold period of time.

Thus, FIG. 5 describes a method of displaying an overlay based on overlay data received separately from media content.

Figure 6:
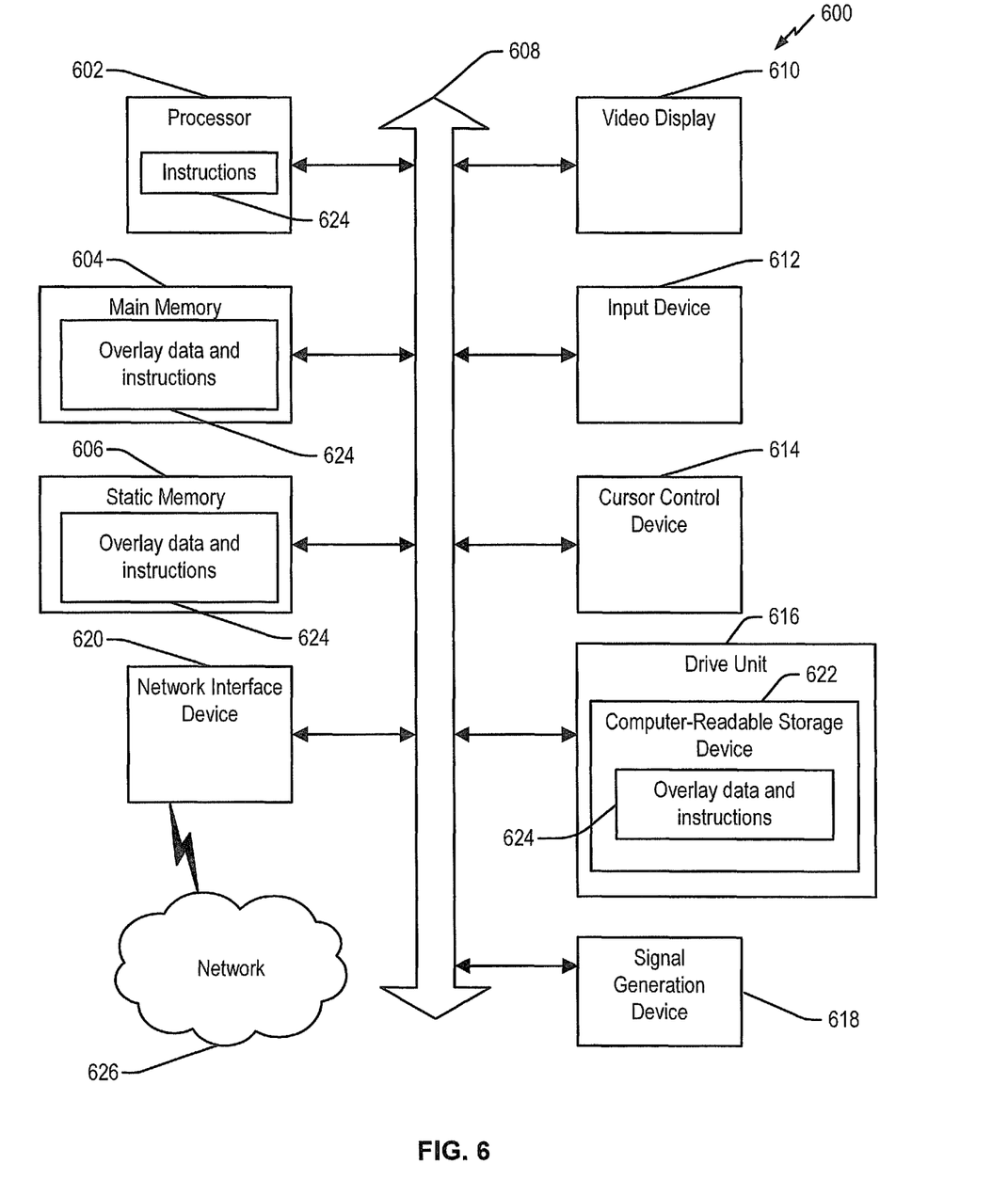
FIG. 6 illustrates a block diagram of a computer system to display an overlay associated with media content.

FIG. 6 illustrates a particular embodiment of a general computer system 600 to display an overlay associated with media content. The general computer system 600 may include a set of instructions that can be executed to cause the general computer system 600 to perform any one or more of the methods or computer based functions disclosed herein. The general computer system 600 may operate as a standalone device or may be connected, e.g., using a network, to other computer systems or peripheral devices. For example, the general computer system 600 may include, be included within, or correspond to one or more of the components of the system 100, the media device 120, the media device 210, the headend 110, or a combination thereof.

In a networked deployment, the general computer system 600 may operate in the capacity of a server or as a client user computer in a server-client user network environment, or as a peer computer system in a peer-to-peer (or distributed) network environment. The general computer system 600 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), a set-top box, a customer premises equipment device, an endpoint device, a web appliance, or any other machine capable of executing a set of instructions (sequential or otherwise) that specify actions to be taken by that machine. In a particular embodiment, the general computer system 600 may be implemented using electronic devices that provide video, audio, or data communication. Further, while one general computer system 600 is illustrated, the term "system" shall also be taken to include any collection of systems or sub-systems that individually or jointly execute a set, or multiple sets, of instructions to perform one or more computer functions.

As illustrated in FIG. 6, the general computer system 600 includes a processor 602, e.g., a central processing unit (CPU), a graphics processing unit (GPU), or both. The processor 602 may be one or more components (e.g., a processor) of the media device 120, the media device 210, or the headend 110, or a combination thereof. Moreover, the general computer system 600 may include a main memory 604 and a static memory 606, which can communicate with each other via a bus 608. For example, the main memory 604 may be one or more components (e.g., a memory) of the media device 120, one or more components (e.g., a memory) of the media device 210, one or more components of the headend 110, or a combination thereof. As shown, the general computer system 600 may further include a video display unit 610, such as a television, liquid crystal display (LCD), an light emitting diode (LED) display, a touch screen display, a flat panel display, a solid state display, or a lamp assembly of a projection system. Additionally, the general computer system 600 may include an input device 612, such as a remote control device (e.g., a television remote or a set top box remote), keyboard, and a cursor control device 614, such as a mouse. In some embodiments, the input device 612 and the cursor control device 614 may be integrated into a single device, such as a capacitive touch screen input device. The general computer system 600 may also include a drive unit 616, a signal generation device 618, such as a speaker or remote control, and a network interface device 620. The general computer system 600 may not include an input device (e.g., a server may not include an input device).

In a particular embodiment, as depicted in FIG. 6, the drive unit 616 may include a computer-readable storage device 622 in which one or more sets of overlay data and instructions 624, e.g. software, can be embedded. The computer-readable storage device 622 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or processor. A computer-readable storage device is not a signal. Further, the instructions 624 may embody one or more of the methods or logic as described herein. The instructions 624 may be executable by the processor 602 to perform one or more functions or methods described herein, such as the method described with reference to FIG. 6. In a particular embodiment, the instructions 624 may reside completely, or at least partially, within the main memory 604, the static memory 606, and/or within the processor 602 during execution by the general computer system 600. The main memory 604 and the processor 602 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include (forms of instructions embodied as a state machine implemented with logic components in an ASIC or a field programmable gate array (FPGA) device.) Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations or methods may perform such operations directly or indirectly by way of one or more intermediate devices directed by the computing device.

The present disclosure includes a computer-readable storage device 622 that stores the overlay data and instructions 624 or receives, stores, and executes the overlay data and instructions 624, so that a device connected to a network 626 may generate an overlay file without modifying media content or may display an overlay based on an overlay file. For example, the computer-readable storage device 622 may include or be included within one or more of the components of the headend 110, one or more components of the media device 120, one or more components of the media device 210, or a combination thereof. While the computer-readable storage device 622 is shown to be a single device, the computer-readable storage device 622 may include a single device or multiple media devices, such as a distributed database, and/or associated caches and servers that store one or more sets of instructions. The computer-readable storage device 622 is capable of storing a set of instructions for execution by a processor to cause a computer system to perform any one or more of the methods or operations disclosed herein.

In a particular non-limiting, exemplary embodiment, the computer-readable storage device 622 may include a solid-state memory such as embedded memory (or a memory card or other package that houses one or more non-volatile read-only memories). Further, the computer-readable storage device 622 may be a random access memory or other volatile re-writable memory. Additionally, the computer-readable storage device 622 may include a magneto-optical or optical device, such as a disk or tapes or other storage device. Accordingly, the disclosure is considered to include any one or more of a computer-readable storage device and other equivalents and successor devices, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Certain proportions thereof may be exaggerated, while others may be minimized. Accordingly, the disclosure and the figures are to be regarded as illustrative rather than restrictive.

In a particular embodiment, a method includes receiving, at a media device, overlay data associated with media content. The overlay data includes information indicating a time and a position at which a particular object is represented within the media content, and the overlay data includes information associating the particular object with supplemental information. The method further includes, during playback of the media content, receiving user input at the media device, and, responsive to the user input, generating an overlay display based on the overlay data, where the overlay display causes the particular object to be highlighted in a display of the media content.

In a particular embodiment, a media device includes a processor and a memory. The memory is accessible to the processor and stores instructions that are executable by the processor to access overlay data associated with media content. The overlay data includes information indicating a time and a position at which a particular object is represented within the media content, and the overlay data includes information associating the particular object with supplemental information. The instructions are further executable by the processor to, during playback of the media content, receive user input and, responsive to the user input, generate an overlay display based on the overlay data, where the overlay display causes the particular object to be highlighted in a display of the media content.

In a particular embodiment, a computer-readable storage device stores instructions that are executable by a processor to perform operations. The operations include receiving, at a media device, overlay data associated with media content. The overlay data includes information indicating a time and a position at which a particular object is represented within the media content, and the overlay data includes information associating the particular object with supplemental information. The operations further include, during playback of the media content, receiving user input at the media device, and, responsive to the user input, generating an overlay display based on the overlay data, where the overlay display causes the particular object to be highlighted in a display of the media content.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a Field PGA. In one or more embodiments, when a processor executes instructions to perform "operations," this can include the processor performing the operations directly and/or facilitating, directing, or cooperating with another device or component to perform the operations.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    sending a media request for media content;
    responsive to the media request for the media content, receiving, at a media device, a single overlay file including overlay data associated with multiple versions of the media content associated with multiple display resolutions, wherein a first subset of entries of the overlay data is associated with a first version of the media content having a first display resolution and a second subset of entries of the overlay data is associated with a second version of the media content having a second display resolution, wherein the first subset of entries includes a first entry associated with a particular object, wherein the second subset of entries includes a second entry associated with the particular object, and wherein the first entry is distinct from the second entry;
    responsive to receiving a first user input during playback of the first version of the media content at the first display resolution, searching the first subset of entries to determine whether an entry of the first subset of entries corresponds to a first coordinate position of the first user input and a first playback time associated with the first version of the media content at a time of receipt of the first user input;
    responsive to determining that a particular first entry of the first subset of entries corresponds to the first coordinate position of the first user input and the first playback time associated with the first version of the media content at the time of receipt of the first user input, generating a first overlay display based on the particular first entry, wherein the first overlay display causes the particular object to be highlighted in a display of the first version of the media content;
    responsive to receiving a second user input during playback of the second version of the media content at the second display resolution, searching the second subset of entries to determine whether an entry of the second subset of entries corresponds to a second coordinate position of the second user input and a second playback time associated with the second version of the media content at a time of receipt of the second user input; and
    responsive to determining that a particular second entry of the second subset of entries corresponds to the second coordinate position of the second user input and the second playback time associated with the second version of the media content at the time of receipt of the second user input, generating a second overlay display based on the particular second entry, wherein the second overlay display causes the particular object to be highlighted in a display of the second version of the media content.

2. The method of claim 1, wherein the single overlay file is received by the media device responsive to an overlay setting being enabled.

3. The method of claim 1, wherein the first subset of entries includes a first selectable object associated with the particular object, and wherein the second entry does not include the first selectable object.

4. The method of claim 1, wherein the first entry is associated with a first time range, wherein the first subset of entries includes a third entry that is associated with a second time range, wherein the first entry includes a first selectable option associated with the particular object, and wherein the first selectable option is not included in the third entry.

5. The method of claim 1, wherein the second display resolution is distinct from the first display resolution.

6. The method of claim 1, wherein the first user input corresponds to a pointer control input, and further comprising determining a position in the display of the first version of the media content of a pointer based on the pointer control input, wherein the particular object is highlighted when the pointer is determined to be within a bounding box defined by the overlay data, and wherein the bounding box is specified by the overlay data.

7. The method of claim 6, further comprising:
    determining a hover duration indicating how long the pointer is within the bounding box; and
    when the hover duration satisfies a threshold, modifying the first overlay display to include user selectable options associated with the particular object.

8. The method of claim 1, wherein the first overlay display includes a description of the particular object, a first selectable option to display additional information related to the particular object, a second selectable option to conduct a transaction related to the particular object, or a combination thereof.

9. The method of claim 1, wherein the single overlay file is received concurrently with media data corresponding to the media content.

10. The method of claim 9, wherein the media data corresponds to the media content in the first display resolution.

11. The method of claim 1, wherein the first overlay display is generated by:
   determining, from the overlay data, an action identifier associated with the particular object;
   sending the action identifier to a remote server; and
   receiving display information from the remote server, wherein the first overlay display is generated based on the display information, and wherein the display information indicates that the first overlay display is to be generated as a pop-up window.

12. A media device comprising:
   a processor; and
   a memory accessible to the processor, the memory storing instructions that are executable by the processor to cause the processor to perform operations, the operations comprising:
      sending a media request for media content;
      responsive to the media request for the media content, receiving a single overlay file including overlay data associated with multiple versions of the media content associated with multiple display resolutions, wherein a first subset of entries of the overlay data is associated with a first version of the media content having a first display resolution and a second subset of entries of the overlay data is associated with a second version of the media content having a second display resolution, wherein the first subset of entries includes a first entry associated with a particular object, wherein the second subset of entries includes a second entry associated with the particular object, and wherein the first entry is distinct from the second entry;
      responsive to receiving a first user input during playback of the first version of the media content at the first display resolution, searching the first subset of entries to determine whether an entry of the first subset of entries corresponds to a first coordinate position of the first user input and a first playback time associated with the first version of the media content at a time of receipt of the first user input;
      responsive to determining that a particular first entry of the first subset of entries corresponds to the first coordinate position of the first user input and the first playback time associated with the first version of the media content at the time of receipt of the first user input, generating a first overlay display based on the particular first entry, wherein the first overlay display causes the particular object to be highlighted in a display of the first version of the media content;
      responsive to receiving a second user input during playback of the second version of the media content at the second display resolution, searching the second subset of entries to determine whether an entry of the second subset of entries corresponds to a second coordinate position of the second user input and a second playback time associated with the second version of the media content at a time of receipt of the second user input; and
      responsive to determining that a particular second entry of the second subset of entries corresponds to the second coordinate position of the second user input and the second playback time associated with the second version of the media content at the time of receipt of the second user input, generating a second overlay display based on the particular second entry, wherein the second overlay display causes the particular object to be highlighted in a display of the second version of the media content.

13. The media device of claim 12, further comprising a wireless sensor, wherein the first user input is received, via the wireless sensor, as a signal from a remote control device, and wherein the signal indicates a movement of the remote control device.

14. The media device of claim 12, wherein the overlay file includes a plurality of overlay entries, each overlay entry of the plurality of overlay entries associated with a corresponding object represented in the media content, and wherein the instructions further cause the processor to store the overlay file in the memory.

15. The media device of claim 14, wherein each overlay entry of the plurality of overlay entries includes information describing the corresponding object, information defining a bounding box associated with the corresponding object, a pointer to additional information related to the corresponding object, or a combination thereof.

16. The media device of claim 14, wherein the single overlay file includes overlay entries corresponding to a plurality of distinct versions of the media content, wherein the plurality of distinct versions of the media content have different display formats.

17. The media device of claim 12, wherein the instructions further cause the processor to receive the media content via a first data stream via a network, wherein the overlay file is received via a second data stream via the network, and wherein the first data stream is distinct from the second data stream.

18. The media device of claim 12, wherein the instructions further cause the processor to:
   while the first overlay display is presented at a display device, automatically pause playback of the media content and store, at the memory, media data associated with portions of the media content that have not yet been provided to the display device; and
   when presentation of the first overlay display ceases, automatically resume playback of the media content using the media data stored at the memory.

19. A computer-readable storage device storing instructions that are executable by a processor to cause the processor to perform operations, the operations comprising:
   sending a media request for media content;
   responsive to the media request for the media content, receiving a single overlay file including overlay data associated with multiple versions of the media content associated with multiple display resolutions, wherein a first subset of entries of the overlay data is associated with a first version of the media content having a first display resolution and a second subset of entries of the overlay data is associated with a second version of the media content having a second display resolution, wherein the first subset of entries includes a first entry associated with a particular object, wherein the second subset of entries includes a second entry associated with the particular object, and wherein the first entry is distinct from the second entry;

responsive to receiving a first user input during playback of the first version of the media content at the first display resolution, searching the first subset of entries to determine whether an entry of the first subset of entries corresponds to a first coordinate position of the first user input and a first playback time associated with the first version of the media content at a time of receipt of the first user input;

responsive to determining that a particular first entry of the first subset of entries corresponds to the first coordinate position of the first user input and the first playback time associated with the first version of the media content at the time of receipt of the first user input, generating a first overlay display based on the particular first entry, wherein the first overlay display causes the particular object to be highlighted in a display of the first version of the media content;

responsive to receiving a second user input during playback of the second version of the media content at the second display resolution, searching the second subset of entries to determine whether an entry of the second subset of entries corresponds to a second coordinate position of the second user input and a second playback time associated with the second version of the media content at a time of receipt of the second user input; and responsive to determining that a particular second entry of the second subset of entries corresponds to the second coordinate position of the second user input and the second playback time associated with the second version of the media content at the time of receipt of the second user input, generating a second overlay display based on the particular second entry, wherein the second overlay display causes the particular object to be highlighted in a display of the second version of the media content.

20. The computer-readable storage device of claim 19, wherein the first overlay display includes a description of the particular object, a first selectable option to display additional information related to the particular object, a second selectable option to conduct a transaction related to the particular object, or a combination thereof.

* * * * *